US008848830B2

(12) United States Patent
Clevorn

(10) Patent No.: US 8,848,830 B2
(45) Date of Patent: Sep. 30, 2014

(54) METHOD FOR PROVIDING A MODULATION SCHEME

(75) Inventor: Thorsten Clevorn, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 309 days.

(21) Appl. No.: 13/298,533

(22) Filed: Nov. 17, 2011

(65) Prior Publication Data

US 2013/0127558 A1    May 23, 2013

(51) Int. Cl.
*H04L 27/36* (2006.01)
*H04L 27/34* (2006.01)

(52) U.S. Cl.
CPC .................................. *H04L 27/3411* (2013.01)
USPC .......................................... 375/298; 332/183

(58) Field of Classification Search
USPC .......................................... 375/298; 332/183
See application file for complete search history.

(56) References Cited

U.S. PATENT DOCUMENTS

| | | | | |
|---|---|---|---|---|
| 7,630,451 B2* | 12/2009 | Collins et al. | ................ | 375/261 |
| 8,249,190 B2* | 8/2012 | Seller | ........................... | 375/298 |
| 8,259,848 B2* | 9/2012 | Malladi | ........................ | 375/298 |
| 8,270,531 B2* | 9/2012 | Golitschek Edler Von Elbwart et al. | ........... | 375/298 |
| 8,548,079 B2* | 10/2013 | Wu et al. | ...................... | 375/261 |
| 2008/0181326 A1* | 7/2008 | Krueger et al. | .............. | 375/261 |
| 2011/0002463 A1* | 1/2011 | Michaels et al. | ............. | 380/268 |
| 2011/0013683 A1* | 1/2011 | Cepeda Lopez | .............. | 375/224 |
| 2011/0243266 A1* | 10/2011 | Roh | .............................. | 375/261 |

OTHER PUBLICATIONS

Clevorn, T. ; Godtmann, S. ; Vary, P.; "PSK versus QAM for iterative decoding of bit-interleaved coded modulation," Global Telecommunications Conference 2004; IEEE GLOBECOM '04; vol. 1, pp. 341-345.*
Thorsten Clevorn et al., "PSK versus QAM for Iterative Decoding of Bit-Interleaved Coded Modulation", IEEE Communications Society Globecom, 2004, pp. 341-345.
Stefan H. MOiler et al., "OFDM with Reduced Peak-to-Average Power Ratio by Multiple Signal Representation", Annals of Telecommunications, vol. 52, No. 1-2, pp. 58-67, 1997.
Stefan H. MOiler et al., "A Comparison of Peak Power Reduction Schemes for OFDM", IEEE Global Telecommunications Conference, pp. 1-5, Nov. 1997.
G. David Forney, Jr et al., "EffiCient Modulation for Band-Limited Channels", IEEE Journal, vol. Sac- 2, No. 5, pp. 632-647, Sep. 1984.

\* cited by examiner

*Primary Examiner* — Shuwang Liu
*Assistant Examiner* — Nader Bolourchi
(74) *Attorney, Agent, or Firm* — Eschweiler & Associates, LLC

(57) ABSTRACT

A method for providing a first modulation scheme based on a second modulation scheme, the second modulation scheme including a first constellation point associated with a first bit pattern and a second constellation point associated with a second bit pattern. The method includes mapping the second bit pattern from the second constellation point to the first constellation point, wherein an energy associated with the second constellation point is greater than an energy associated with the first constellation point.

23 Claims, 16 Drawing Sheets

US 8,848,830 B2

1

METHOD FOR PROVIDING A MODULATION SCHEME

FIELD

The invention relates to a method for providing a first modulation scheme based on a second modulation scheme and a device for modulating data according to a first modulation scheme based on a second modulation scheme.

BACKGROUND

A Crest factor or peak-to-average-power-ratio (PAPR) describes for a signal constellation set (SCS) or constellation scheme a ratio between a maximum power a single constellation point in the signal constellation set can have to an average power of all constellation points of the SCS. A high Crest factor may result in problems for amplifiers, in particular in terms of linearity.

Data transmissions between radio devices constantly have to be improved. In particular, it may be desirable to provide a Crest factor resulting in an improved data transmission.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

2

Figure 11:
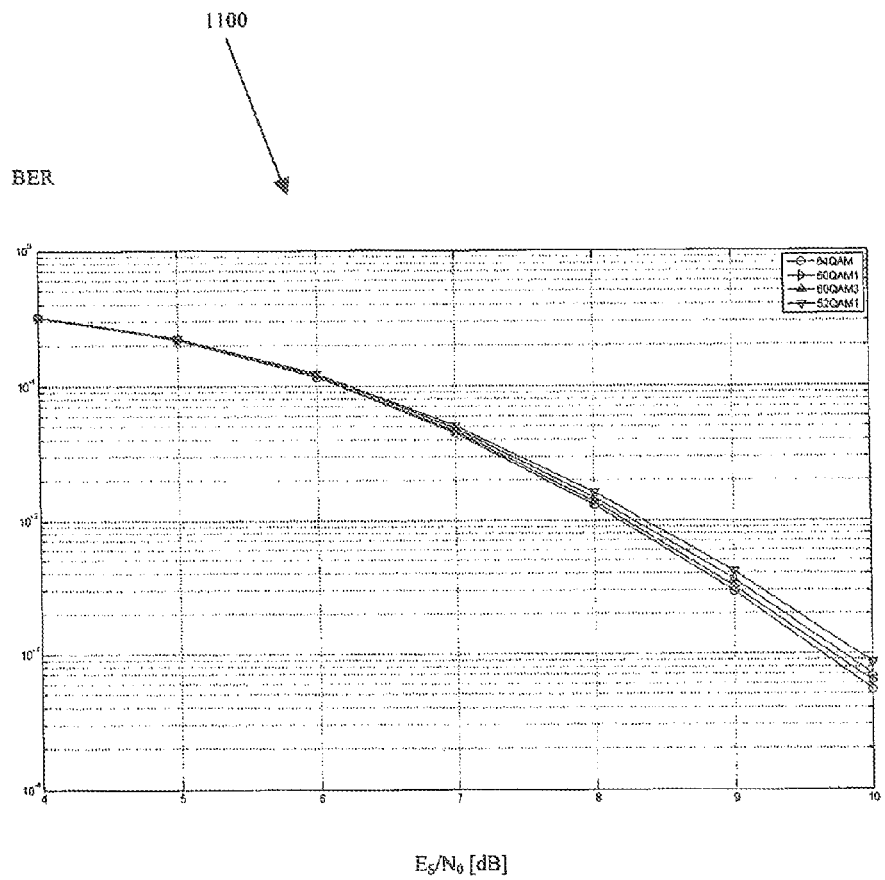

FIG. 11 illustrates a performance diagram of a method for providing a first modulation scheme based on a second modulation scheme when using a convolutional code with r=0.33 and memory=6 as the channel code.

Figure 12:
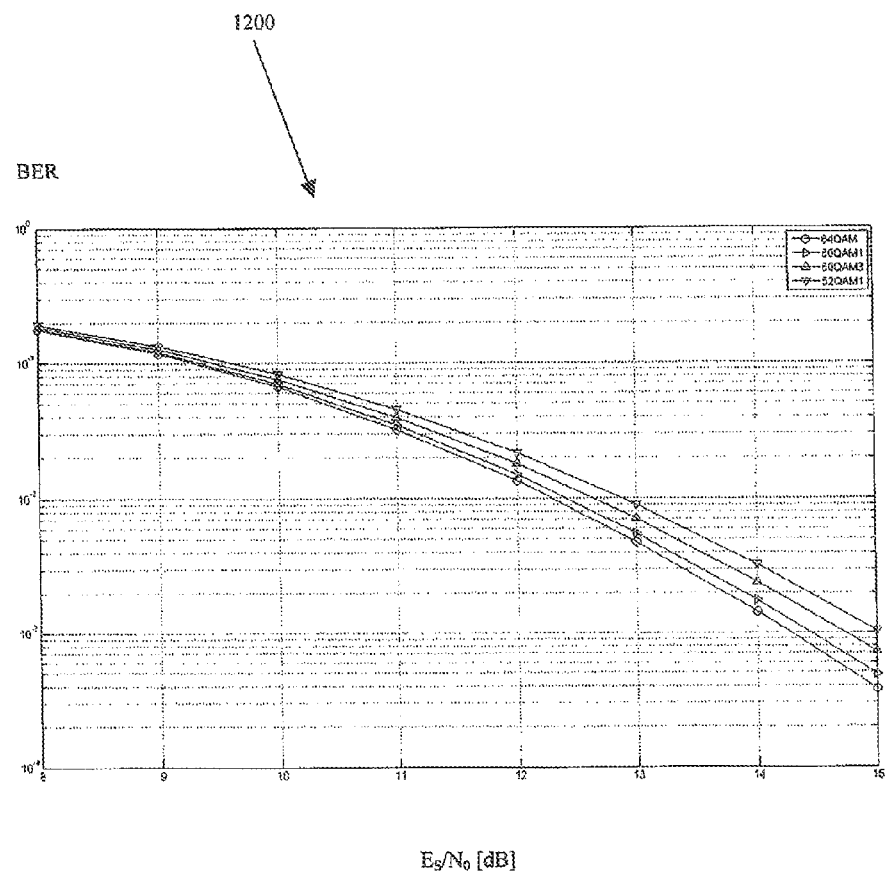

FIG. 12 illustrates a performance diagram of a method for providing a first modulation scheme based on a second modulation scheme when using a convolutional code with r=0.5 and memory=3 as the channel code.

Figure 13:
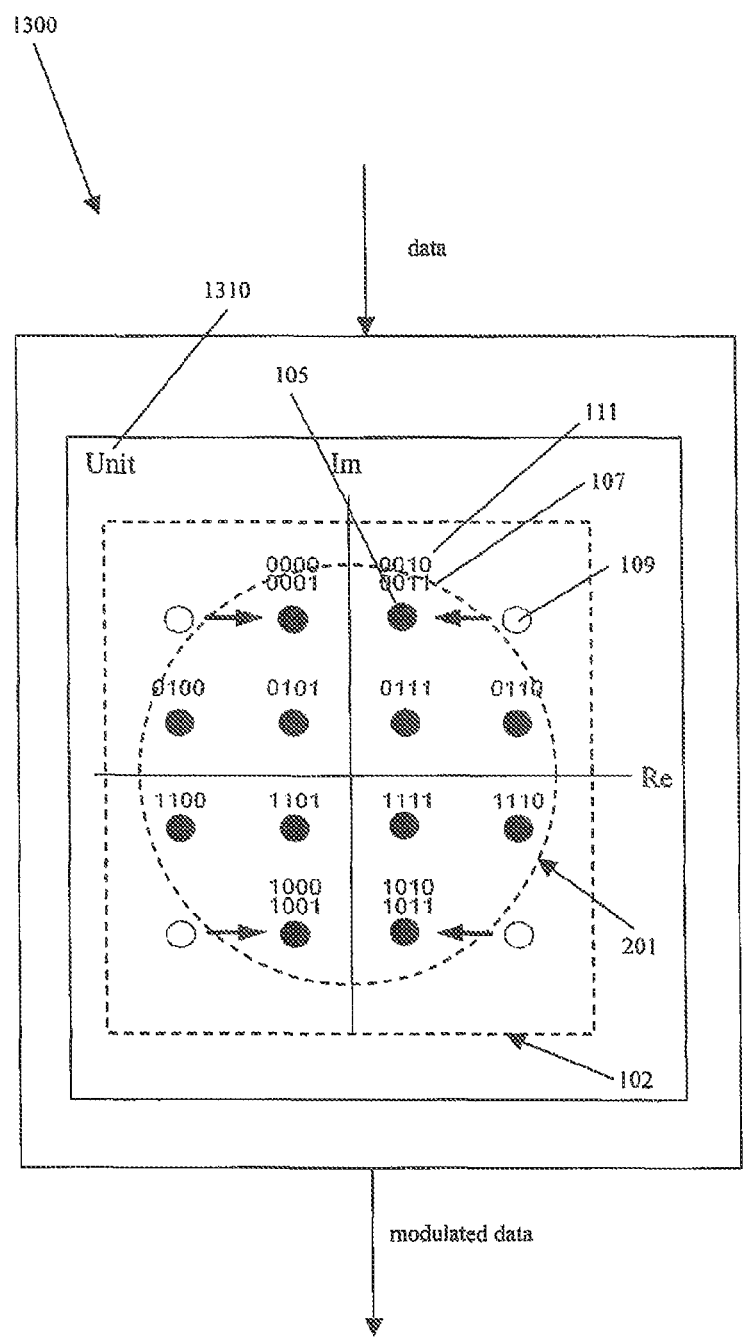

FIG. 13 illustrates a block diagram of a device 1300 for modulating data according to a first modulation scheme based on a second modulation scheme as an exemplary embodiment.

Figure 14:
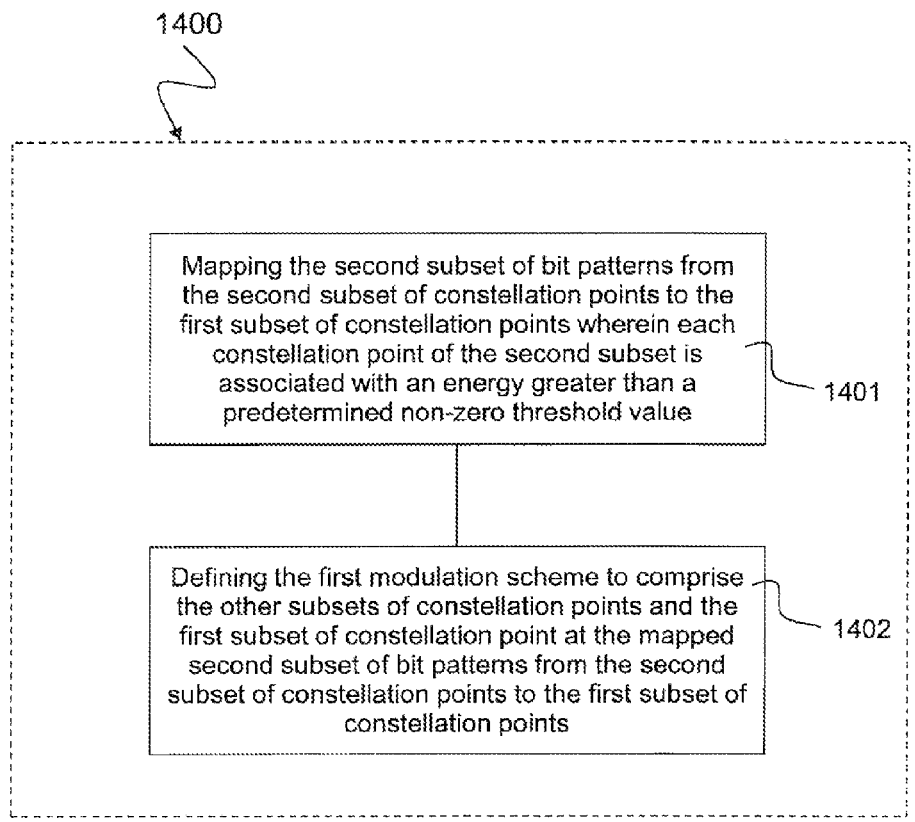

FIG. 14 schematically illustrates a method 1400 for providing a first modulation scheme based on a second modulation scheme as an exemplary embodiment.

Figure 15:
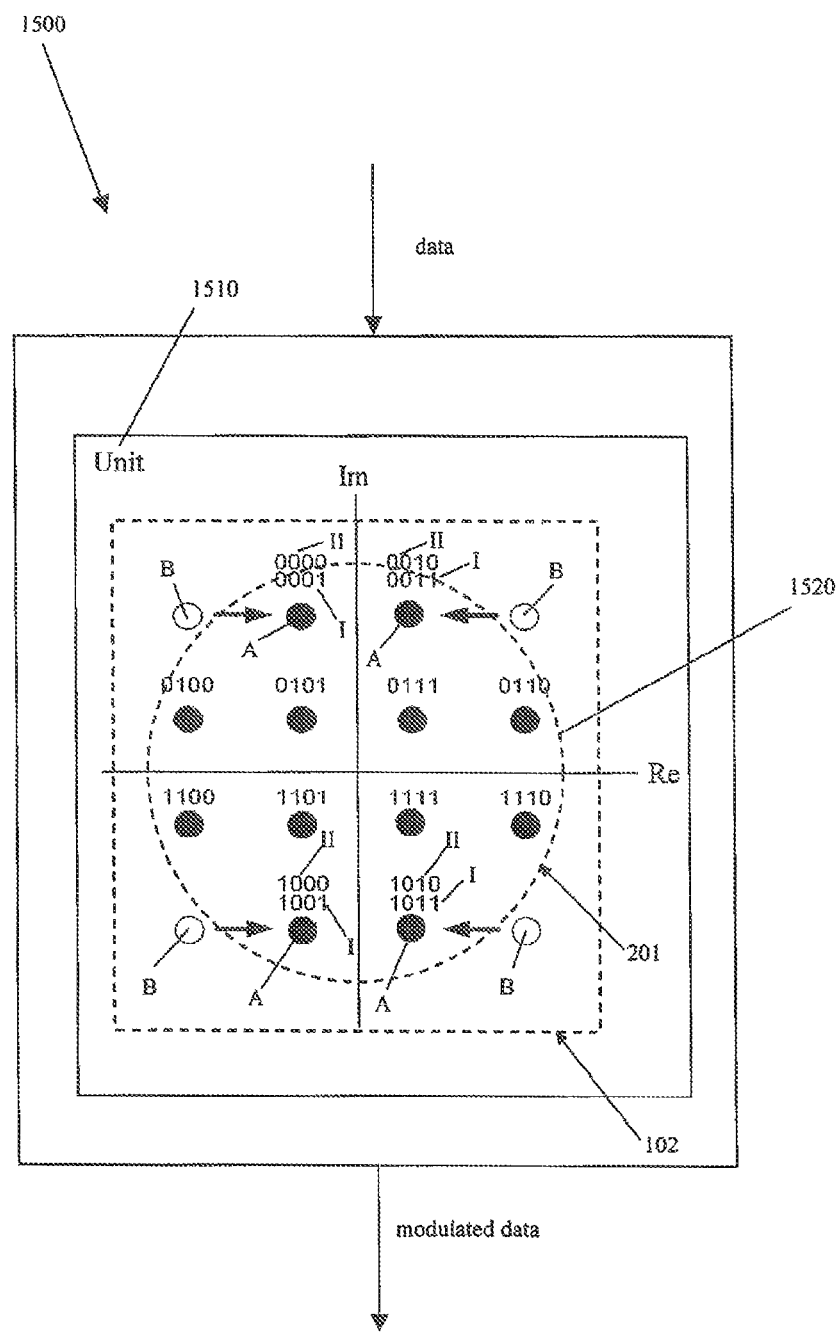

FIG. 15 illustrates a block diagram of a device 1500 for modulating data according to a first modulation scheme based on a second modulation scheme as an exemplary embodiment.

Figure 16:
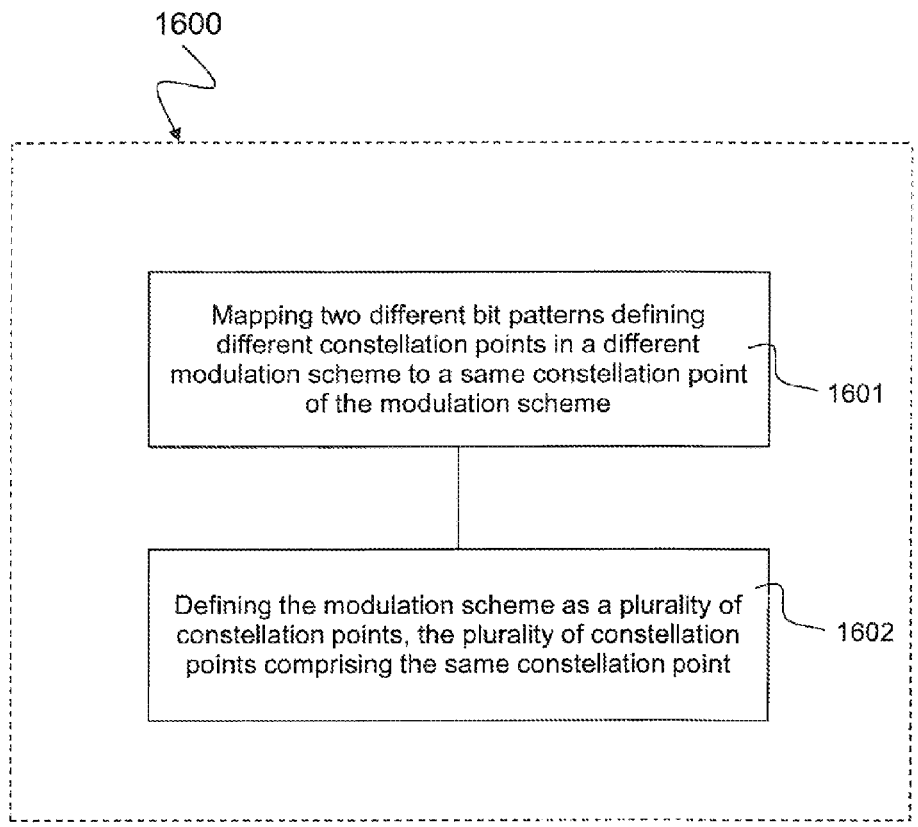

FIG. 16 schematically illustrates a method 1600 for providing a modulation scheme as an exemplary embodiment.

In the following detailed description, reference is made to the accompanying drawings, which form a part thereof, and in which is shown by way of illustration specific embodiments in which the invention may be practiced. It is understood that other embodiments may be utilized and structural or logical changes may be made without departing from the scope of the present invention. The following detailed description, therefore, is not to be taken in a limiting sense, and the scope of the present invention is defined by the appended claims.

In the following, various modulation schemes, methods for providing modulation schemes and devices for modulating data according to such modulation schemes are described separately or with reference to each other. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary embodiments described herein may be combined with each other, unless specifically noted otherwise.

Modulation may be seen as the process of conveying a message signal, for example a digital bit stream, inside another signal that may be physically transmitted. Modulation of a sine waveform is used to transform a baseband message signal into a passband signal, for example a low-frequency audio signal into a radio-frequency (RF) signal. In radio communications, cable TV systems or the public switched telephone network (PSTN), electrical signals may be transferred using a limited passband frequency spectrum with specific (non-zero) lower and upper cutoff frequencies. Modulating a sine-wave carrier makes it possible to keep the frequency content of the transferred signal as close as possible to the centre frequency (typically the carrier frequency) of the passband.

An aim of digital modulation may be to transfer a digital bit stream over an analog bandpass channel, for example over the public switched telephone network (in which a bandpass filter limits the frequency range between 300 Hz and 3400 Hz) or over a limited radio frequency band. In digital modulation, an analog carrier signal may be modulated by a discrete signal. The changes in the carrier signal are chosen from a finite number of M alternative symbols (the modulation alphabet).

Digital modulation schemes or techniques may be based on keying. In the case of phase-shift keying (PSK), a finite number of phases are used. In the case of frequency-shift keying (FSK), a finite number of frequencies are used while in amplitude-shift keying (ASK), a finite number of amplitudes are used. Further, in the case of quadrature amplitude modulation (QAM), a finite number of at least two phases and at least two amplitudes are used while in QAM, an inphase signal (the I signal, for example a cosine waveform) and a quadrature phase signal (the Q signal, for example a sine wave) are amplitude modulated with a finite number of amplitudes and summed. This can be seen as a two-channel system, each channel using ASK wherein the resulting signal is equivalent to a combination of PSK and ASK. Each of these phases and amplitudes may be assigned a unique pattern of binary bits. Usually, each phase and amplitude encodes an equal number of bits. This number of bits includes a "symbol" represented by the particular phase and amplitude. If the alphabet consists of $M=2^N$ alternative symbols, each symbol represents a message consisting of N bits. If the symbol rate (also known as the baud rate) is $f_S$ symbols/second (or baud), the data rate is $Nf_S$ bit/second. For example, with an alphabet consisting of 16 alternative symbols, each symbol represents four bits. Hence, the data rate is four times the baud rate. In the case of PSK, ASK or QAM, where the carrier frequency of the modulated signal is constant, the modulation alphabet may be represented on a constellation diagram (i.e. as a constellation scheme), showing the amplitude of the I signal at the x-axis and the amplitude of the Q signal at the y-axis for each symbol.

In the following, constellation diagrams are described. A constellation diagram or a constellation scheme may correspond to a representation of a signal modulated by a digital modulation scheme such as QAM or PSK. It may display the signal as a two-dimensional scatter diagram (i.e. a mathematical diagram using Cartesian coordinates to display values for two variables for a set of data) in the complex plane at symbol sampling instants. The constellation diagram may thus represent the possible symbols that may be selected by a given modulation scheme as points in the complex plane. Measured constellation diagrams may be used to recognize the type of interference and distortion in a signal. Since the symbols are represented as complex numbers, they may be visualized as points in the complex plane. The real and imaginary axes may be called the in phase or I-axis and the quadrature or Q-axis, respectively. Plotting several symbols in a scatter diagram results in the constellation diagram. The points on a constellation diagram may be referred to as constellation points. They are a set of modulation symbols including the modulation alphabet. Also a diagram of ideal positions, a signal space diagram, in a modulation scheme may be called a constellation diagram. In this sense, the constellation does not correspond to a scatter diagram, but a representation of the scheme itself.

For example, modulation schemes may be QAM, a combination of PSK and ASK, e.g. 16QAM, 64QAM, 1024QAM or 4096QAM. Modulation schemes like 16QAM and 64QAM may be considered as higher order signal constellation sets for wireless communications, e.g. high speed data packet access (HSDPA) and long term evolution (LTE) while modulation schemes like 1024QAM and 4096QAM may be considered as higher order signal constellation sets for wireline communication, e.g. digital subscriber line (DSL). Even modulation schemes having more constellation points may be used due to lower noise. For limiting bit and block errors, modulation schemes may be applied using a Gray mapping. In Gray mapped modulation schemes the bit patterns of neighboring points usually differ by only a single bit.

In the following, various modulators, demodulators and devices for modulating data are described. A modulator or a device for modulating data may be implemented in a transmitter or transceiver. In order to transmit data, the modulator or the device for modulating data may perform one or more of the following steps:
1. Group incoming data bits into codewords or bit patterns, one for each symbol that will be transmitted.
2. Map the codewords to attributes, for example amplitudes of the I and Q signals (the equivalent low pass signal), or frequency or phase values according to a modulation scheme.
3. Adapt pulse shaping or some other filtering to limit the bandwidth and form the spectrum of the equivalent low pass signal, typically using digital signal processing.
4. Perform digital-to-analog conversion (DAC) of the I and Q signals, e.g. by using digital signal processing (DSP).
5. Generate a high-frequency sine wave carrier waveform, and/or a cosine quadrature component. Carry out the modulation, for example by multiplying the sine and cosine wave form with the I and Q signals, resulting in that the equivalent low pass signal is frequency shifted into a modulated passband signal or RF signal. This may be achieved by using DSP technology.
6. Amplification and analog bandpass filtering to avoid harmonic distortion and periodic spectrum.

At a receiver side a demodulator or a device for demodulating data may be implemented. A device for modulating data may include a device for demodulating data, in this case it is called a modem (device for modulating/demodulating data). A device for demodulating data may perform one or more of the following steps:
1. Bandpass filtering.
2. Automatic gain control (AGC) to compensate for attenuation, for example fading.
3. Frequency shifting of an RF signal to the equivalent baseband I and Q signals or to an intermediate frequency (IF) signal by multiplying the RF signal with a local oscillator sinewave and cosine wave frequency.
4. Sampling and analog-to-digital conversion (ADC), for example by means of undersampling.
5. Equalization filtering, for example using a matched filter, compensation for multipath propagation, time spreading, phase distortion and frequency selective fading to avoid intersymbol interference and symbol distortion.
6. Detection of the amplitudes of the I and Q signals or the frequency or phase of the IF signal.
7. Quantization of the amplitudes, frequencies or phases to the nearest allowed symbol values.
8. Mapping of the quantized amplitudes, frequencies or phases to codewords (bit patterns or bit groups) according to a modulation scheme.
9. Parallel-to-serial conversion of the codewords into a bit stream.
10. Passing the resultant bit stream on for further processing such as removal of any error-correcting codes.

In the following, various channel codes, convolutional codes, Digital Video Broadcasting Satellite $2^{nd}$ generation (DVBS2) codes, Turbo codes and low density parity check (LDPC) codes are described.

In digital communications, the term "channel code" usually refers to a forward error correction code and bit interleaving in communication and storage, wherein the communication media or storage media may be viewed as a channel. The channel code may be used to protect data sent over it for storage or retrieval even in the presence of noise (errors).

Channel codes may be made up of two main type of codes, convolutional codes and block codes.

Convolutional codes are usually used for real-time error correction and may convert a data stream into one single codeword. A Viterbi algorithm provides a basis for the main decoding strategy of convolutional codes. The encoded bits depend not only on the current informational k input bits, but also on past input bits, i.e. the memory of the code. A convolutional code is a type of error-correcting code in which each m-bit information symbol (each m-bit string) to be encoded may be transformed into an n-bit symbol, where m/n corresponds to the code rate (n=m) and the transformation is a function of the last k information symbols wherein k is the constraint length or the memory parameter of the code.

Block codes may be based on a finite field arithmetic and abstract algebra. Block codes accept a block of k information bits and return a block of n coded bits. Block codes are usually used for correcting or detecting errors in a data transmission. Commonly used block codes are Reed-Solomon codes, BCH codes, Golay codes and Hamming codes.

DVB-S2 codes are related to the Digital Video Broadcasting Satellite-Second Generation (DVB-S2) which is a digital television broadcast standard that has been designed as a successor for the DVB-S (Digital Video Broadcasting Satellite) system. Compared to the DVB-S standard, DVB-S2 provides a coding scheme based on a modern LDPC code as well as Variable Coding and Modulation (VCM) and Adaptive Coding and Modulation (AOM) which allow optimizing bandwidth utilization by dynamically changing transmission parameters.

DVB-S2 provides VCM to optimize bandwidth utilization based on the priority of the input data and ACM to allow flexibly adapting transmission parameters to reception conditions of terminals, e.g. switching to a lower code rate during fading. There are four modulation modes: QPSK, 8PSK, 16APSK and 32APSK. DVB-S2 may provide improved rolloff factors of 0.20 and 0.25 in addition to the roll-off factor of DVB-S which is 0.35. DVB-S2 provides improved coding by concatenating a large LDPC code with an outer BCH code to achieve quasi-error-free (QEF) reception conditions on an additional white gaussian noise (AWGN) channel. The outer code is introduced to avoid error floors at low bit-error rates. A single forward error correction (FEC) frame may have either 64800 bits (normal) or 16200 bits (short). DVB-S2 provides several code rates for a flexible configuration of transmission parameters, which are r=1/4, 1/3, 2/5, 1/2, 3/5, 2/3, 3/4, 4/5, 5/6, 8/9, and 9/10. Code rates r=1/4, 1/3 and 2/5 have been introduced for poor reception conditions in combination with QPSK modulation. An optional input stream synchronization may provide a constant end-to-end delay.

Turbo codes may refer to a class of high-performance FEC codes and were designed for achieving reliable information transfer over bandwidth- or latency-constrained communication links in the presence of data-corrupting noise. There are many different instantiations of turbo codes, using different component encoders, input/output ratios, interleavers and puncturing patterns.

An LDPC code may correspond to a linear error correcting code that is constructed using a sparse bipartite graph. LDPC codes are capacity-approaching codes, which means that practical constructions exist that allow the noise threshold to be set very close to the theoretical maximum (the Shannon limit) for a symmetric memory-less channel. The noise threshold defines an upper bound for the channel noise, up to which the probability of lost information may be made as small as desired. Using iterative belief propagation techniques, LDPC codes may be decoded in time linear to their block length. For large block sizes, LDPC codes may be constructed by first studying the behavior of decoders. As the block size tends to infinity, LDPC decoders may be shown to have a noise threshold below which decoding is reliably achieved and above which decoding is not achieved. This threshold may be optimized by finding the best proportion of arcs from check nodes and arcs from variable nodes.

DETAILED DESCRIPTION

The methods and devices described herein may be implemented in wireless and wireline communication, in particular communications using higher order modulations, e.g. according to an LTE, OFDM or DSL standard. The methods and devices described below may further be implemented in a base station (or NodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. Said frequency range corresponds to frequencies of alternating current electrical signals used to produce and detect radio waves.

The described methods and devices may be designed, for example, to implement a Universal Mobile Telecommunications System (UMTS) standard, e.g. one of the Release 99, 4, 5, 6, 7, 8, 9 and higher versions. The methods and devices may further implement an High Speed Packet Access (HSPA) mobile telephony protocol, such as High Speed Downlink Packet Access (HSDPA), High Speed Uplink Packet Access (HSUPA) and Evolved HSPA (HSPA+), for example. The methods and devices may further be designed to implement standards such as the Wideband Code Division Multiple Access (WCDMA) standard, the LTE mobile communications standard, the Evolved Universal Terrestrial Radio Access Network (E-UTRAN) standard, the High Speed Orthogonal Frequency Division Multiplex Packet Access (HSOPA) standard, the Super 3G standard defined by the Third Generation Partnership Project (3GPP) standardization organization or the GSM (Global System for Mobile communications) standard. In addition, the described methods and devices may be designed to implement the Worldwide Interoperability for Microwave Access (WiMAX) standard or the Institute of Electrical and Electronics Engineers (IEEE) 802.16 standard, for example. Therefore the methods or devices described herein should not be construed as being limited to any particular standard.

Figure 1:
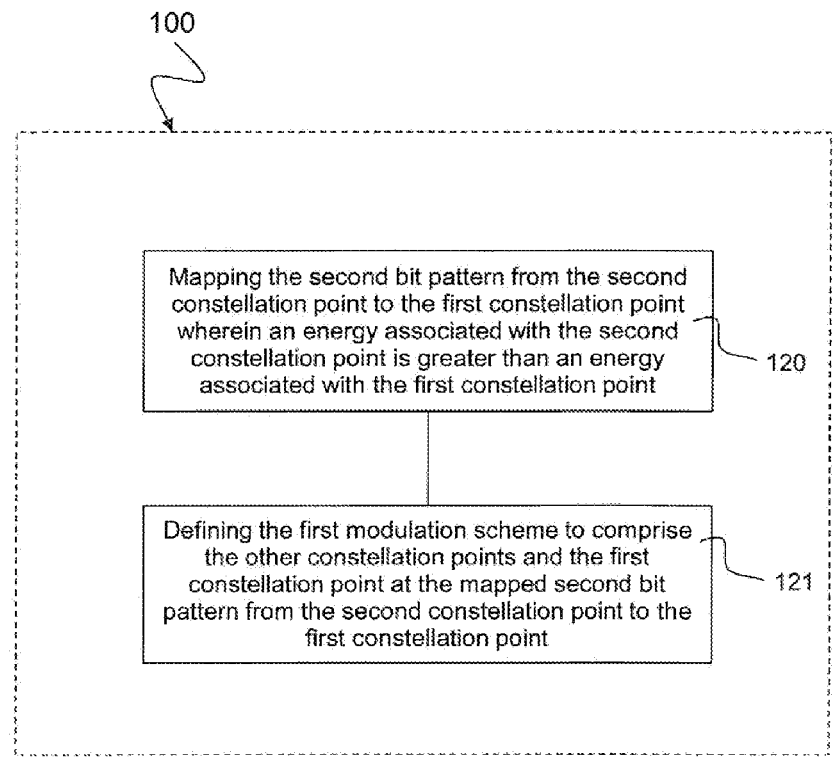
FIG. 1 schematically illustrates a method 100 for providing a first modulation scheme based on a second modulation scheme as an exemplary embodiment.
Figure 2:
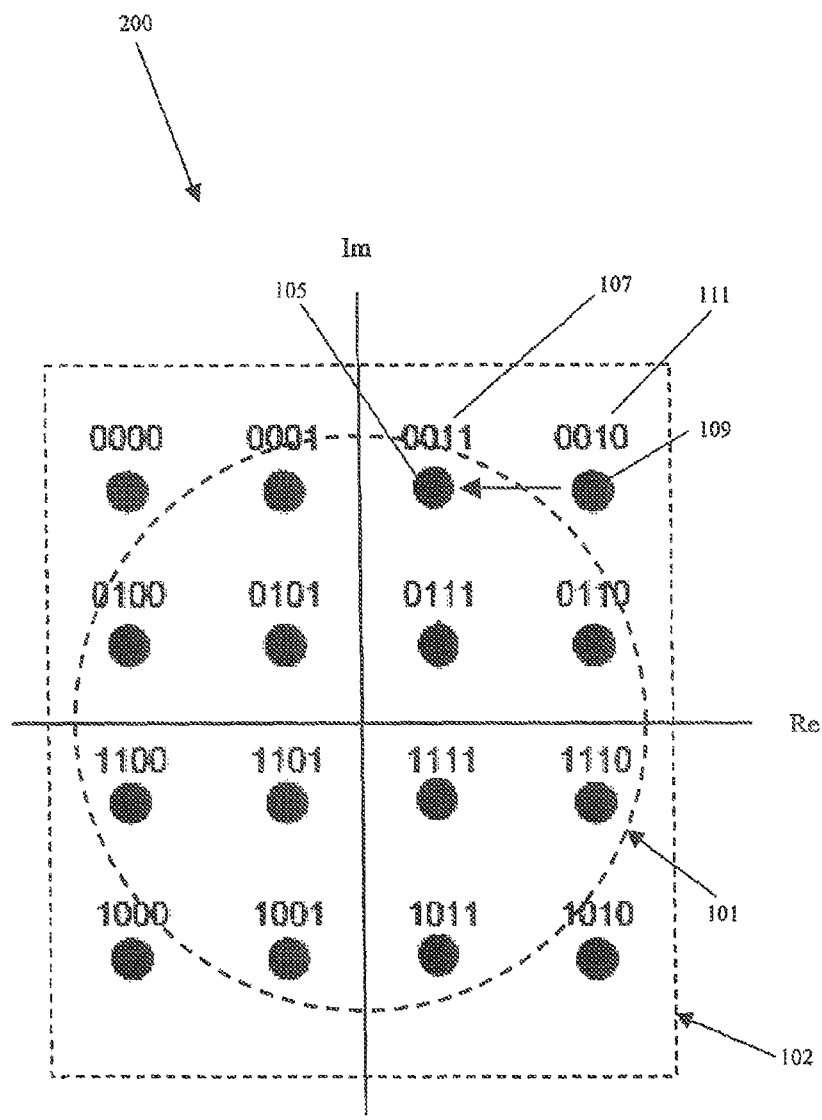
FIG. 2 schematically illustrates a constellation diagram 200 of a first modulation scheme and a second modulation scheme.

FIG. 1 schematically illustrates a method 100 for providing a first modulation scheme based on a second modulation scheme as an exemplary embodiment. The method 100 may be read in connection with FIG. 2 that is described in more detail below. As depicted in FIG. 2, the second modulation scheme 102 contains a first constellation point 105 associated with a first bit pattern 107 and a second constellation point 109 associated with a second bit pattern 111. The method 100 includes a step 120 of mapping the second bit pattern 111 from the second constellation point 109 to the first constellation point 105, wherein an energy associated with the second constellation point 109 is greater than an energy associated with the first constellation point 105.

Figure 3:
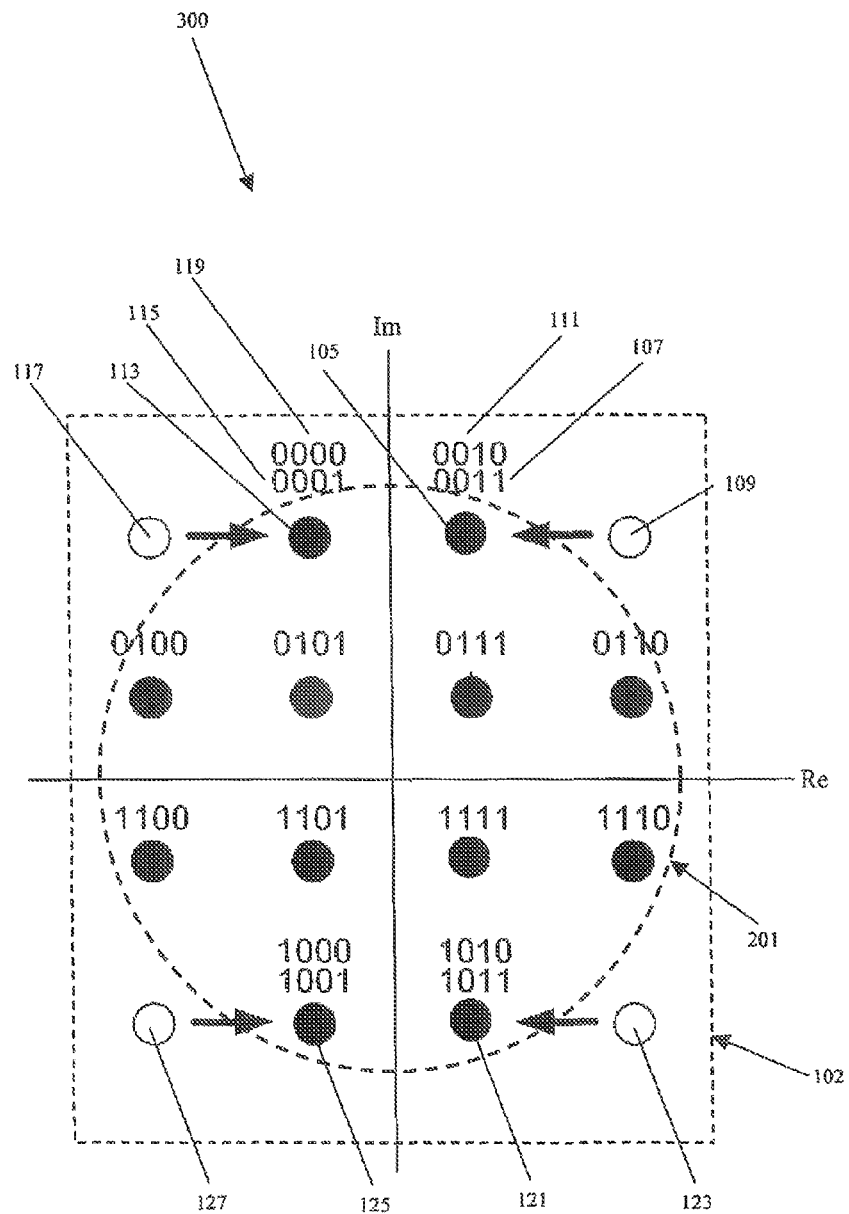
FIG. 3 schematically illustrates a further constellation diagram 300 of a first modulation scheme and a second modulation scheme.
Figure 5:
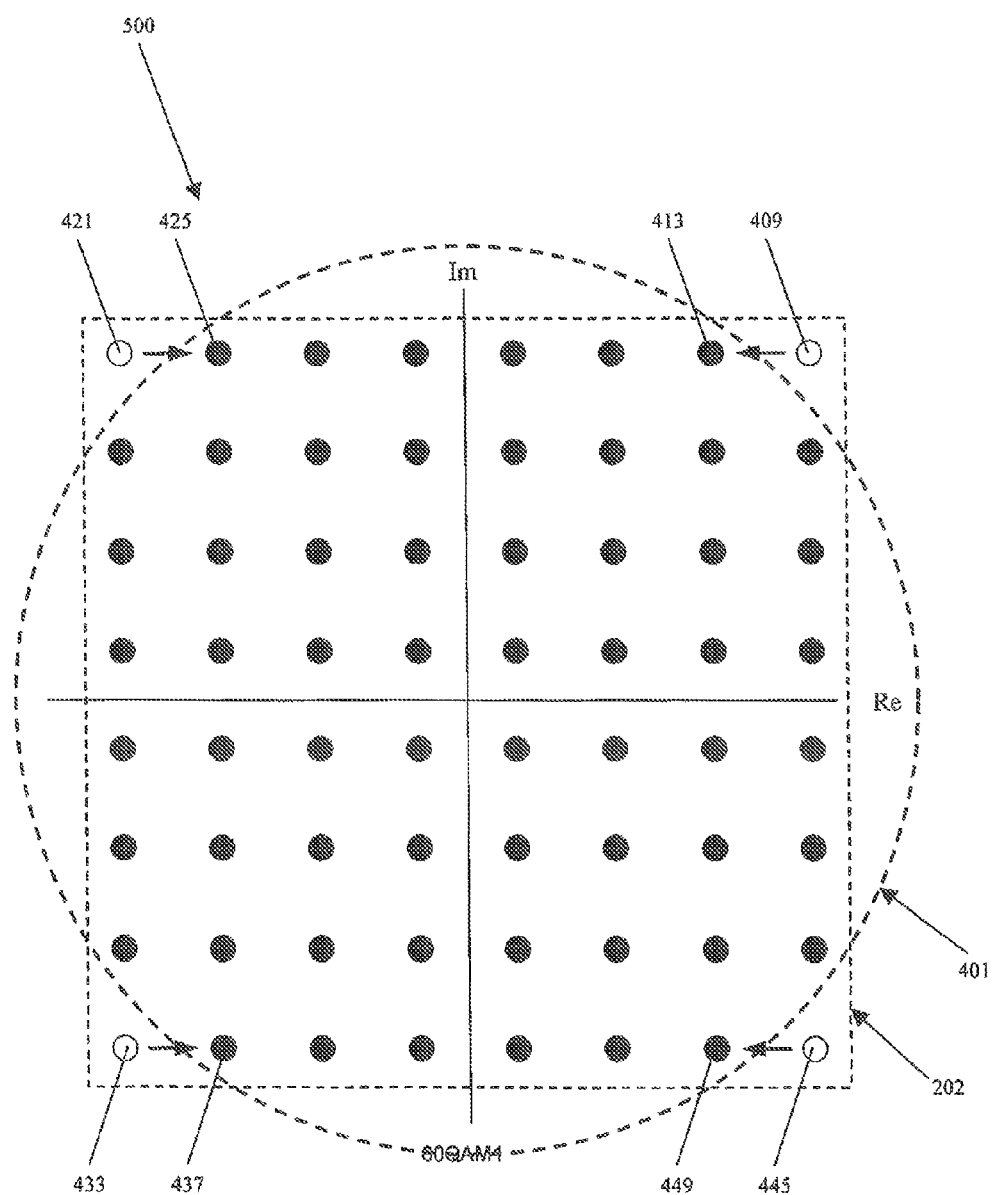
FIG. 5 schematically illustrates a further constellation diagram 500 of a first modulation scheme and a second modulation scheme.
Figure 6:
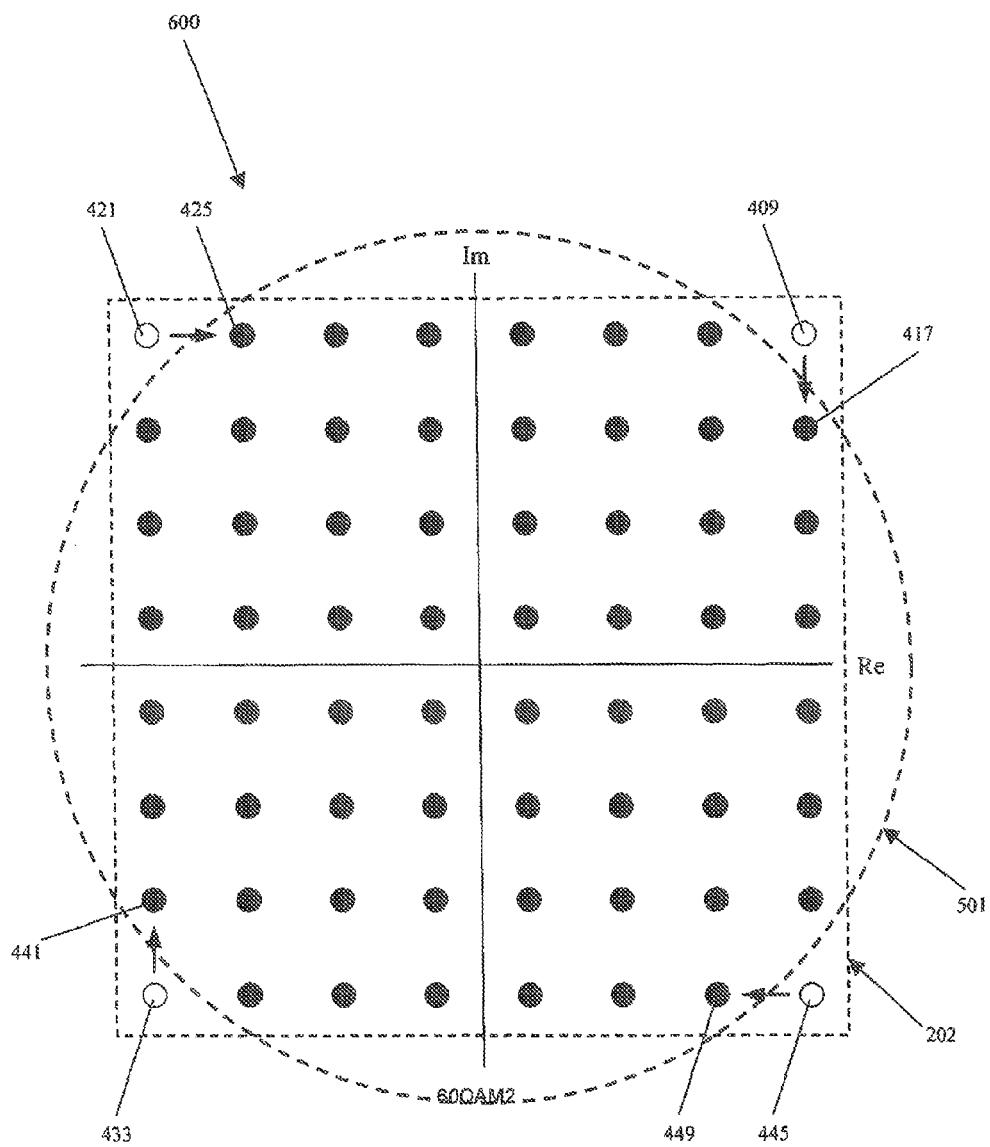
FIG. 6 schematically illustrates a further constellation diagram 600 of a first modulation scheme and a second modulation scheme.
Figure 7:
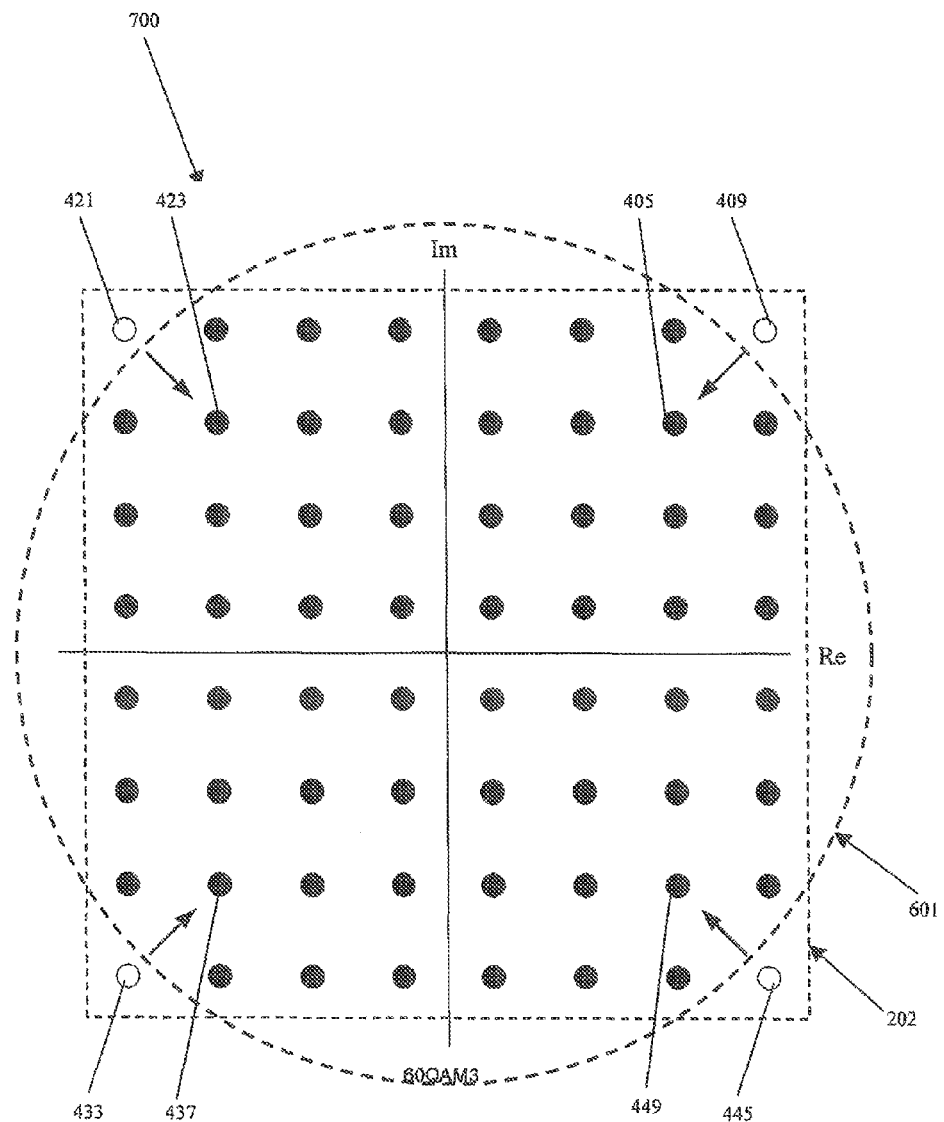
FIG. 7 schematically illustrates a further constellation diagram 700 of a first modulation scheme and a second modulation scheme.
Figure 8:
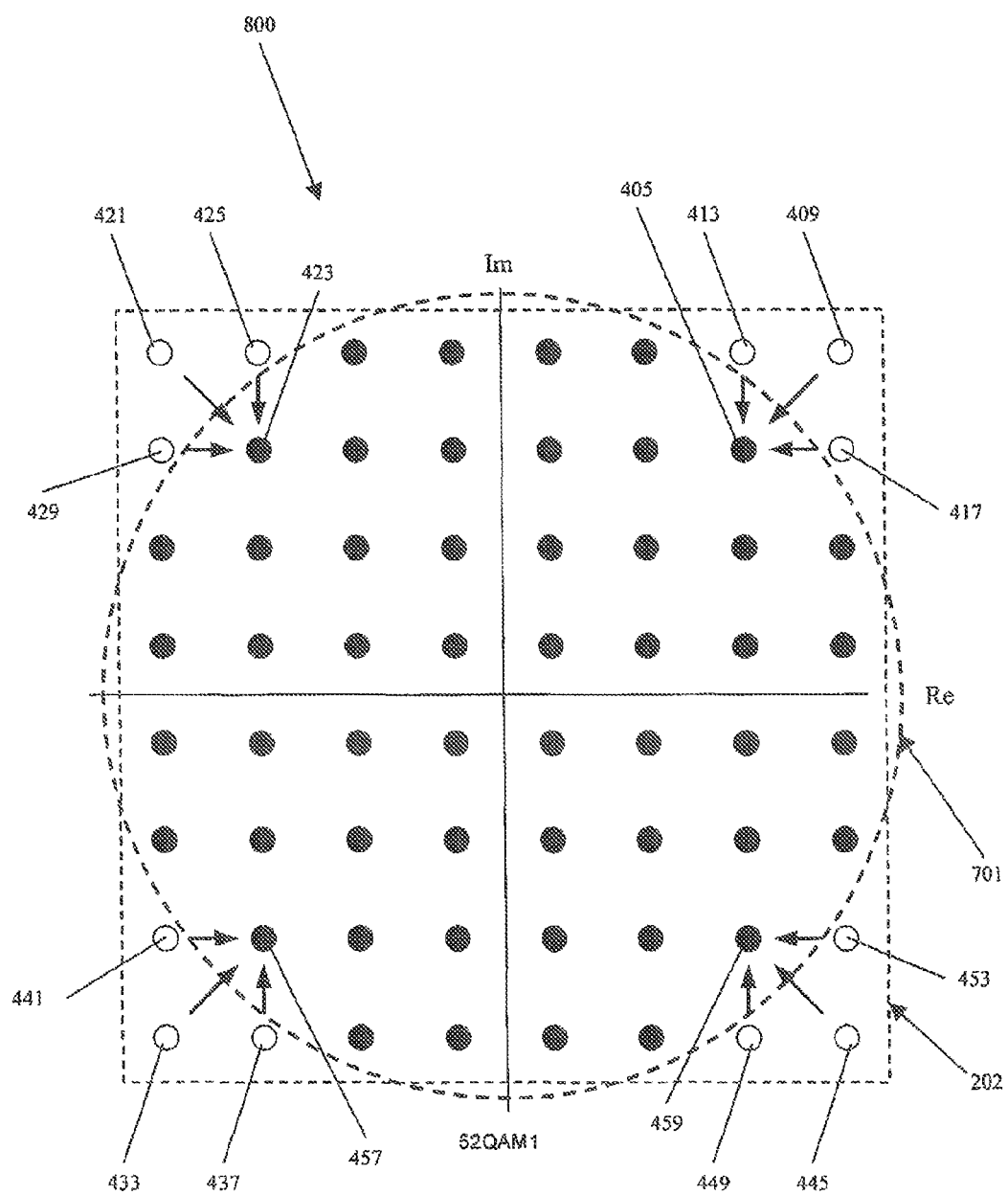
FIG. 8 schematically illustrates a further constellation diagram 800 of a first modulation scheme and a second modulation scheme.

According to exemplary embodiments the second modulation scheme may be a 16QAM modulation scheme as illustrated in FIGS. 2 and 3. According to further exemplary embodiments the second modulation scheme may be a 64QAM modulation scheme as illustrated in FIGS. 4 to 8. According to further exemplary embodiments the first modulation scheme may be a (16−x)QAM modulation scheme with x={1, 2, . . . , M} as illustrated in FIGS. 2 and 3. According to exemplary embodiments the second modulation scheme may be a (64−x)QAM modulation scheme with x={1, 2, . . . , M} as illustrated in FIGS. 4 to 8, for example a "60QAM1" modulation scheme as depicted in FIG. 5, a "60QAM2" modulation scheme as depicted in FIG. 6, a "60QAM3" modulation scheme as depicted in FIG. 7 or a "52QAM1" modulation scheme as depicted in FIG. 8.

The constellation points 105 and 109 are arranged in a complex plane spanned by an axis "Re" describing the real part and by an axis "Im" describing the imaginary part. An energy associated with each constellation point 105 and 109 may correspond to a distance between the respective constellation point 105 and 109 and an origin of the complex plane. In an alternative embodiment an energy associated with each constellation point corresponds to the peak amplitude of a waveform modulated by the respective constellation point divided by the root mean square (RMS)value of the modulated waveform.

The position of the constellation points in the modulation scheme may define a Crest factor or PAPR of the modulation scheme. The Crest factor may be defined as a ratio of the maximum power or energy a single constellation point in the constellation diagram may have to the average power or energy of all the constellation points. The Crest factor or peak-to-average ratio (PAR) or PAPR of a waveform may be obtained by calculating the ratio between the peak amplitude and the RMS value of the waveform. It may therefore be a dimensionless quantity often expressed in decibels (dB). A minimum possible Crest factor is 1 or 0 dB. By mapping the second bit pattern 111 from the second constellation point 109 to the first constellation point 105, an energy of the waveform generated from the second bit pattern 111 and thus the Crest factor may be reduced. In addition, the mapping results in a shape of the first modulation scheme 101 which is more circular compared to the shape of the second modulation scheme 102 resulting in a lower Crest factor and a lower PAPR.

In one embodiment, the method 100 may further contain modulating a carrier signal with a phase and an amplitude of the first constellation point to obtain a modulated signal.

FIG. 2 schematically illustrates a constellation diagram 200 of a first modulation scheme 101 and a second modulation scheme 102. The second modulation scheme 102 corresponds to a 16QAM modulation scheme including constellation points. Each of these 16 constellation points is associated to a different bit pattern from the set {(0000), (0001), (0010), (0011), (0100), (0101), (0110), (0111), (1000), (1001), (1010), (1011), (1100), (1101), (1110), (1111)}. Gray coding may be used such that bit patterns associated to adjacent constellation points differ in a single bit. FIG. 2 illustrates a second modulation scheme 102 being based on a Gray mapping.

The first modulation scheme 101 is derived from the second modulation scheme 102 by mapping the second constellation point 109 associated with the second bit pattern 111 ("0010") to the first constellation point 105 associated with the first bit pattern 107 ("0011"). Note that an energy of the second constellation point 109 is higher than an energy of the first constellation point 105, wherein the energy of each constellation point may be defined as its distance to the centre of the constellation diagram 200. For non-symmetrical modulation schemes the energy may also be defined as the distance of a respective constellation point to a reference point in the constellation diagram. In FIG. 2, the second constellation point 109 is an edge point of the second modulation scheme 102.

In alternative embodiments the first modulation scheme 101 may be derived from the second modulation scheme 102 by mapping the second constellation point 109 to a first constellation point associated with the bit pattern "0110" or by mapping the second constellation point 109 to a first constellation point associated with the bit pattern "0111". In all these first modulation schemes 101 the energy of the second constellation point 109 is greater than the energy of the first constellation point.

In further embodiments the first modulation scheme 101 may be derived from the second modulation scheme 102 by mapping a further second constellation point, e.g. the constellation point associated with the bit pattern "1010" to a further first constellation point, e.g. the constellation point associated with the bit pattern "1011". Note that an energy of the further second constellation point is higher than an energy of the further first constellation point. In a further embodiment the constellation point associated with the bit pattern "1000" may be mapped to the constellation point associated with the bit pattern "1001" and the constellation point associated with the bit, pattern "0000" may be mapped to the constellation point associated with the bit pattern "0001". Such a mapping is illustrated in FIG. 3 and described below.

In further embodiments the first modulation scheme 101 may be derived from the second modulation scheme 102 by mapping the second constellation point 109 arranged in the first quadrant of the constellation diagram 200 to a first constellation point arranged in a different quadrant of the constellation diagram 200, for example to a first constellation point in the third quadrant associated with one of the bit patterns "1101", "1100", "1001", to a first constellation point in the second quadrant associated with one of the bit patterns "0100", "0001", "0101" or to a first constellation point in the fourth quadrant associated with one of the bit patterns "1111", "1110" or "1011". In each case, an energy of the second constellation point 109 is higher than an energy of the first constellation point.

The first modulation scheme 101 and the second modulation scheme 102 have average powers depending on the powers of all constellation points of the respective modulation scheme, e.g. their average powers are weighted sums of the powers of all constellation points. In one embodiment, a distance between constellation points of the first modulation scheme 101 is increased such that the average power of the first modulation scheme 101 substantially equals the average power of the second modulation scheme 102.

FIG. 3 schematically illustrates a constellation diagram 300 of a first modulation scheme 201 and a second modulation scheme 102. The second modulation scheme 102 is similar to the second modulation scheme 102 of FIG. 1.

The first modulation scheme 201 is derived from the second modulation scheme 102 by mapping a second constellation point 109 associated with a second bit pattern 111 ("0010") to a first constellation point 105 associated with a first bit pattern 107 ("0011"), by mapping a fourth constellation point 117 associated with a fourth bit pattern 119 ("0000") to a third constellation point 113 associated with a third bit pattern 115 ("0001"), by mapping a sixth constellation point 123 associated with a sixth bit pattern "1010" to a fifth constellation point 121 associated with a fifth bit pattern "1011" and by mapping an eighth constellation point 127 associated with an eighth bit pattern "1000" to a seventh constellation point 125 associated with a seventh bit pattern "1001".

The 16QAM modulation scheme 102 corresponds to a regular SCS having 16 signal points or constellation points. Thus, usually 4=Id(16) bits are mapped to each signal point. The usual unique bit mapping of bit patterns to signal points corresponds to a so-called Gray mapping that ensures that the bit patterns of neighboring signal points differ by only a single bit. Gray mapping thus may minimize the BER and may have a good performance. For special cases, e.g. Trellis Coded Modulation (TCM), different mappings may be used, e.g. Set-Partitioning mapping. Gray mapped 16QAM is depicted as the second modulation scheme 102 in FIG. 3.

The signal points or constellation points impacting or increasing the PAPR usually are the outer four constellation points at the corner points of the constellation diagram, i.e. the constellation points 109, 117, 123 and 127. Hence, improving the PAPR may be obtained by moving these corner points closer to the centre. However, only moving the corner points closer to the centre may result in making modulation and demodulation more difficult, since the points are on many different IQ levels and there are no simple straight-forward decision boundaries anymore. Therefore, according to embodiments of the invention, "outer" constellation points are mapped to "inner" constellation points that are arranged closer to the centre of the constellation diagram than the "outer" constellation points.

In FIG. 3, the four outer constellation points 109, 117, 123 and 127 are moved on top of four neighboring points 105, 113, 121 and 125, respectively. After moving, two bit patterns are thus assigned to one signal point. This mapping may be referred to as non-unique bit mapping (NU-BM). As the SCS is not regular anymore, i.e. from the shape and the logarithm to the basis of 2 with respect to the number of constellation points not equal to number of bits, the new SCS may be denoted as non-regular SCS (NR-SCS). The NR-SCS of FIG. 3 may be called 12QAM because it still follows a regular QAM structure, but merely includes 12 signal points. Since it fits the regular QAM structure, modulation and demodulation may remain unchanged. Further, most signal points and bit patterns follow the Gray mapping rule such that the NU-BM may be called "near-Gray".

A decoder may not distinguish between the two bit patterns assigned to the same signal point. A typical demodulator generates bit-wise probabilities or hard decisions. Since still the first three bits of the two bit patterns (e.g. "0000" and "0001") are identical, there will be no difference for these three bits and no impact at all on the demodulated value. The last (fourth) bit is identical for both bit patterns. Thus, the demodulation metric for this bit will be identical for the bit having a value of "0" or "1" which may be interpreted as erasure or puncturing. This puncturing of the fourth bit only happens if one of the four signal points with two bit patterns is transmitted. Thus, the puncturing is kind of random, but an average puncturing rate may be computed. For the case of FIG. 3 the original 16 signal points may transmit 16×4=64 bits. However, the receiver may only detect 8×4+8×3=56 bits. The puncturing may then be defined as (64−56)/64=12.5%. The described random puncturing may generate a performance degradation, but using a channel code this degradation is usually small, especially with a strong channel code that is depicted in FIGS. 9 to 12 below.

The proposed scheme may result in a performance gain with respect to the performance taking the random puncturing into account. The four outer points may cause a high PAPR, but may also dominate the average power of the mapping. Thus, with these four points moved closer to the centre, the whole SCS/mapping may be scaled "larger" in order to have the same average power (e.g. unit 1) as the original SCS/mapping combination. With the "larger" scaling, the distances between the signal points increase which may result in a better demodulation performance. This way, a performance loss of the first modulation scheme 201 of FIG. 3 with NU-BM and NR-SCS (with random puncturing and scaling effect included) is usually small compared to the classic schemes. Note that associated performance diagrams are shown in FIGS. 9 to 12.

According to an embodiment, a demodulator generates bit-wise probabilities or hard decisions. Amplitude and phase of a received IF signal is quantized to the nearest allowed constellation point depending on a hard decision or soft decision scheme. The quantized amplitudes and phases are mapped to codewords or bit patterns. By mapping outer constellation points to inner constellation points, the decision thresholds or decision probabilities may be changed, since the nearest allowed constellation points change. From FIG. 3 it becomes apparent that a phase/amplitude value originally mapped to a constellation point 109 associated with the bit pattern "0010" is now mapped to one of the constellation points associated with the bit patterns "0011", "0111" and "0110". However, a demodulator generating decision thresholds according to a 16QAM modulation scheme may still be applied although its error rate may be increased compared to a demodulator generating decision thresholds according to a 12QAM modulation scheme (see FIG. 3).

The first modulation scheme 201 and the second modulation scheme 102 have average powers depending on the powers of all constellation points of the respective modulation scheme, e.g. their average powers are weighted sums of the powers of all constellation points. In one embodiment, a distance between constellation points of the first modulation scheme 201 is increased such that the average power of the first modulation scheme 201 substantially equals the average power of the second modulation scheme 102.

In a further embodiment, after the mapping, constellation points of the first modulation scheme 201 are re-mapped in the constellation diagram 300 to a third modulation scheme. The re-mapping may be in such a manner that their shape forms a circle, e.g. by forming an 8-PSK constellation with constellation points associated with bit patterns "0110", "0010/0011", "0000/0001", "0100", "1100", "1000/1001", "1010/1011" and "1110" and by forming a 4-PSK constellation with constellation points associated with bit patterns "0111", "0101", "1101" and "1111". Such a 8-PSK/4-PSK constellation may result in an improved Crest factor.

Figure 4:
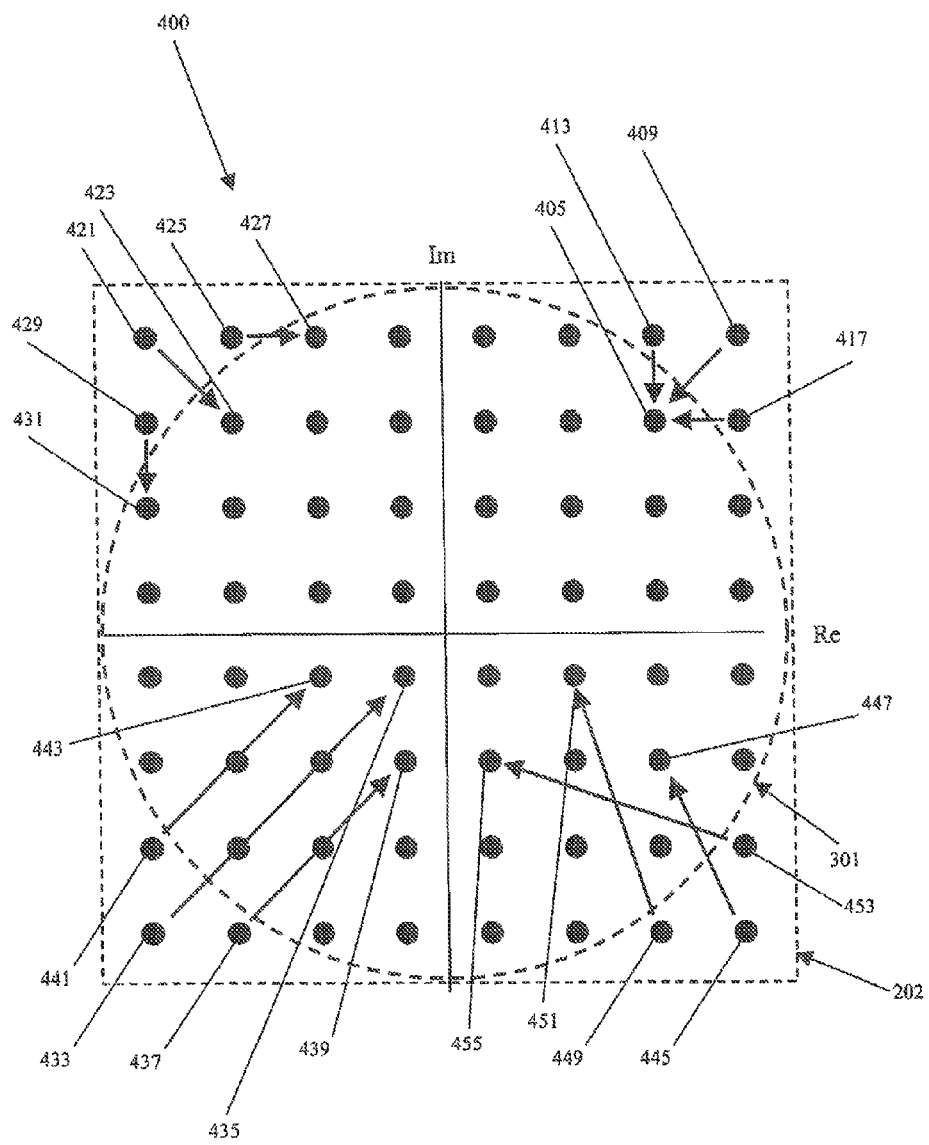
FIG. 4 schematically illustrates a further constellation diagram 400 of a first modulation scheme and a second modulation scheme.

FIG. 4 schematically illustrates a constellation diagram 400 of a first modulation scheme 301 and a second modulation scheme 202 as an exemplary embodiment. The second modulation scheme 202 corresponds to a 64QAM modulation scheme including 64 constellation points. Each of these constellation points is associated to a different bit pattern corresponding to different combinations of 6 bits, i.e. a bit pattern from the set {(000000), (000001), . . . , (111111)}.

The first modulation scheme 301 is derived from the second modulation scheme 202 by mapping one or more constellation points associated with different bit patterns of the second modulation scheme 202 to one or more constellation points of the first modulation scheme 301. In FIG. 4 the four quadrants of the constellation diagram 400 illustrate different exemplary scenarios of the mapping.

In the first quadrant of the constellation diagram 400 more than one constellation point of the second modulation scheme 202 is mapped to one single constellation point of the first modulation scheme 301. In detail, FIG. 4 illustrates a mapping of three constellation points 409, 413 and 417 of the second modulation scheme 202 to a single constellation point 405 of the first modulation scheme 301 (note that the constellation point 405 is also a constellation point of the second constellation scheme 202). The energy of each of the three constellation points 409, 413 and 417 of the second modulation 202 scheme is higher than the energy of the constellation point 405 of the first modulation scheme 301. In addition, each of the three constellation points 409, 413 and 417 of the second modulation scheme 202 is adjacent to (neighboring) the constellation point 405 of the first modulation scheme 301.

In the second quadrant of the constellation diagram 400 more than one constellation point of the second modulation scheme 202 is mapped to more than one constellation point of the first modulation scheme 301. In detail, FIG. 4 illustrates a mapping of three constellation points 421, 425 and 429 of the second modulation scheme 202 to three constellation points 423, 427 and 431, respectively, of the first modulation scheme 301 (note that the constellation points 423, 427 and 431 are also constellation points of the second constellation scheme 202). Here, the mapping is one-to-one, i.e. each of the three constellation points 421, 425, 429 of the second modulation scheme 202 is mapped to a different constellation point of the first constellation scheme 301. The energy of each of the three constellation points 421, 425 and 429 of the second modulation scheme 202 is higher than an energy of each of the three constellation points 423, 427 and 431 of the first modulation scheme 301. Further, the three constellation points 421, 425 and 429 of the second modulation scheme 202 are adjacent to the three constellation points 423, 427 and 431 of the first modulation scheme 301.

In the third quadrant of the constellation diagram 400 more than one constellation point of the second modulation scheme 202 is mapped to more than one constellation point of the first modulation scheme 301 that are not adjacent to the constellation points of the second modulation scheme 202. In detail, FIG. 4 illustrates a mapping of three constellation points 433, 437 and 441 of the second modulation scheme 202 to three constellation points 435, 439 and 443, respectively, of the first modulation scheme 301. The mapping is one-to-one as described above with respect to the second quadrant. The energy of each of the three constellation points 433, 437 and 441 of the second modulation scheme 202 is higher than the energy of each of the three constellation points 435, 439 and 443 of the first modulation scheme 301. Note that the three constellation points 433, 437 and 441 of the second modulation scheme 202 are not adjacent to the three constellation points 435, 439 and 443 of the first modulation scheme 301. Instead, the three constellation points 435, 439 and 443 lie close to the centre of the constellation diagram 400 and thus have low energies compared to other constellation points.

In the fourth quadrant of the constellation diagram 400 more than one constellation point of the second modulation scheme 202 is mapped to more than one constellation point of the first modulation scheme 301 that may be adjacent to the constellation points of the second modulation scheme 202 or not. In detail, FIG. 4 illustrates a mapping of three constellation points 445, 449 and 453 of the second modulation scheme 202 to three constellation points 447, 451 and 455, respectively, of the first modulation scheme 301. The mapping is one-to-one and random. However, the random mapping is such that the energy of each of the three constellation points 445, 449 and 453 of the second modulation scheme 202 is higher than the energy of each of the three constellation points 447, 451 and 455 of the first modulation scheme 301.

Using the described mappings, the shape of the first modulation scheme 301 is more circular than the shape of the second modulation scheme 202 resulting in a lower Crest factor and a lower peak-to-average-power-ratio.

Although FIG. 4 illustrates different mapping scenarios for each quadrant, embodiments of the mappings may be such that the same mapping is applied to each quadrant or at least to two quadrants or at least to three quadrants. Note that the mapping scenarios depicted in the four quadrants of the constellation diagram 400 are exemplary. Thus, it is possible to apply different kinds of mappings 120. Further, the mapping may also be applied to different modulation schemes, e.g. 16QAM, 256QAM, 1024QAM, 4096QAM or non-QAM modulation schemes.

FIGS. 5 to 8 illustrate constellation diagrams 500, 600, 700 and 800 of different first modulation schemes 401, 501, 601 and 701 based on a second modulation scheme 202. The second modulation scheme 202 is similar to the second modulation scheme described in connection with FIG. 4. The first modulation schemes 401, 501, 601 and 701 may be denoted as 60QAM1, 60QAM2, 60QAM4 and 52QAM1 modulation schemes and show shapes that are more similar to a circle compared to the shape of the 64QAM modulation scheme resulting in lower Crest factors and lower PAPRs.

FIG. 5 schematically illustrates a constellation diagram 500 of a first modulation scheme 401 and a second modulation scheme 202. The second modulation scheme 202 is similar to the second modulation scheme 202 of FIG. 4. The first modulation scheme 401 (denoted "60QAM1") is derived from the second modulation scheme 202 by mapping a second constellation point 409 of the second modulation scheme 202 to a first constellation point 413 adjacent to the second constellation point 409, mapping a fourth constellation point 421 of the second modulation scheme 202 to a third constellation point 425 adjacent to the fourth constellation point 421, mapping a sixth constellation point 433 of the second modulation scheme 202 to a fifth constellation point 437 adjacent to the sixth constellation point 433 and mapping an eighth constellation point 445 of the second modulation scheme 202 to a seventh constellation point 449 adjacent to the eighth constellation point 445. Here, energies of the second, fourth, sixth and eighth constellation points 409, 421, 433, 445 are higher than energies of the first, third, fifth and seventh constellation points 413, 425, 437, 449.

FIG. 6 schematically illustrates a constellation diagram 600 of a first modulation scheme 501 and a second modulation scheme 202. The second modulation scheme 202 is similar to the second modulation scheme 202 of FIGS. 4 and 5.

The first modulation scheme 501 (denoted "60QAM2") is derived from the second modulation scheme 202 by mapping a second constellation point 409 of the second modulation scheme 202 to a first constellation point 417 adjacent to the second constellation point 409, mapping a fourth constellation point 421 of the second modulation scheme 202 to a third constellation point 425 adjacent to the fourth constellation point 421, mapping a sixth constellation point 433 of the second modulation scheme 202 to a fifth constellation point 441 adjacent to the sixth constellation point 433 and mapping an eighth constellation point 445 of the second modulation scheme 202 to a seventh constellation point 449 adjacent to the eighth constellation point 445. Note that energies of the second, fourth, sixth and eighth constellation points 409, 421, 433, 445 are higher than energies of the first, third, fifth and seventh constellation points 417, 425, 441, 449, respectively. The described mapping is clockwise with respect to the constellation diagram 600. Of course, the mapping 120 may also be counterclockwise with respect to the constellation diagram 600 in another embodiment.

FIG. 7 schematically illustrates a constellation diagram 700 of a first modulation scheme 601 and a second modulation scheme 202 as an exemplary embodiment. The second modulation scheme 202 is similar to the second modulation scheme 202 of FIGS. 4 to 6.

The first modulation scheme 601 (denoted "60QAM3") is derived from the second modulation scheme 202 by mapping a second constellation point 409 of the second modulation scheme 202 to a first constellation point 405 adjacent to the second constellation point 409, mapping a fourth constellation point 421 of the second modulation scheme 202 to a third constellation point 423 adjacent to the fourth constellation point 421, mapping a sixth constellation point 433 of the second modulation scheme 202 to a fifth constellation point 437 adjacent to the sixth constellation point 433 and mapping an eighth constellation point 445 of the second modulation scheme 202 to a seventh constellation point 449 adjacent to the eighth constellation point 445. Energies of the second, fourth, sixth and eighth constellation points 409, 421, 433, 445 are higher than energies of the first, third, fifth and seventh constellation points 405, 423, 437, 449. Again, the mapping 120 is oriented towards the centre of the constellation diagram 700.

FIG. 8 schematically illustrates a constellation diagram 800 of a first modulation scheme 701 and a second modulation scheme 202. The second modulation scheme 202 is similar to the second modulation scheme 202 of FIGS. 4 to 7.

The first modulation scheme 701 (denoted "52QAM1") is derived from the second modulation scheme 202 by mapping three constellation points 409, 413, 417 of the second modulation scheme 202 to one constellation point 405 adjacent to the three constellation points 409, 413, 417, mapping further three constellation points 421, 425, 429 of the second modulation scheme 202 to one constellation point 423 adjacent to the three constellation points 421, 425, 429, mapping further three constellation points 433, 437, 441 of the second modulation scheme 202 to one constellation point 457 adjacent to the three constellation points 433, 437, 441 and mapping further three constellation points 445, 449, 453 of the second modulation scheme 202 to one constellation point 459 adjacent to the three constellation points 445, 449, 453. Here, energies of constellation points 409, 413, 417, 421, 425, 429, 433, 437, 441, 445, 449, 453 are higher than energies of the constellation points 405, 423, 457, 459. The mapping 120 is oriented towards the centre of the constellation diagram 700.

Figure 9:
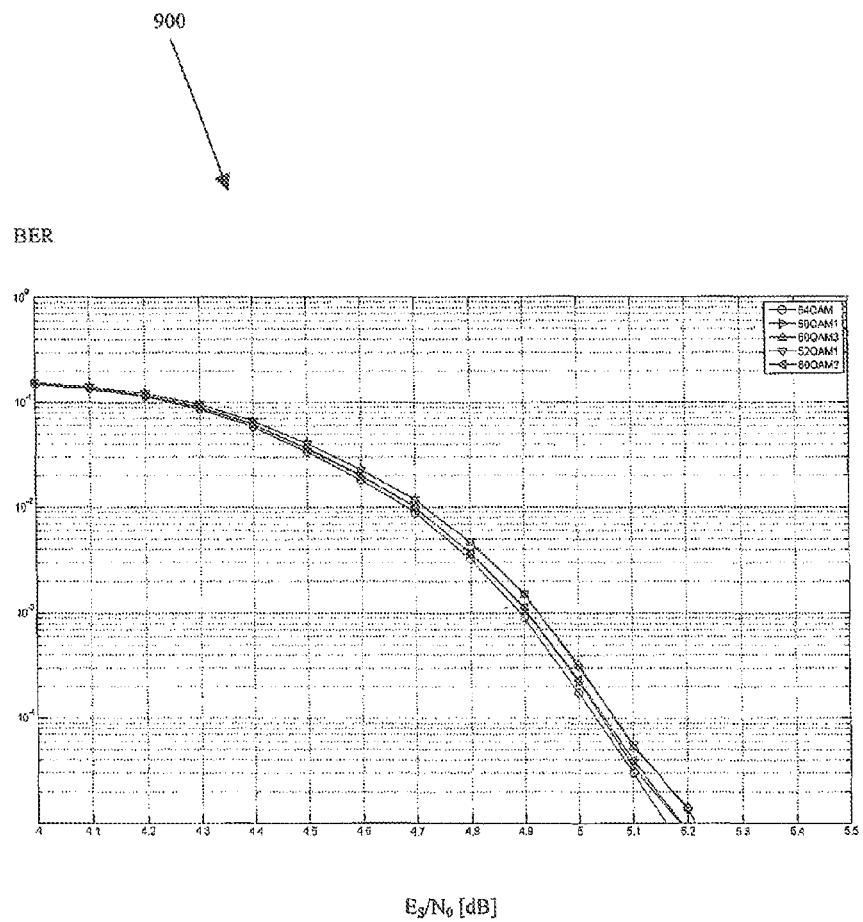
FIG. 9 illustrates a performance diagram 900 of a method for providing a first modulation scheme based on a second modulation scheme when using a DVBS2 code with r=0.25 as the channel code.
Figure 10:
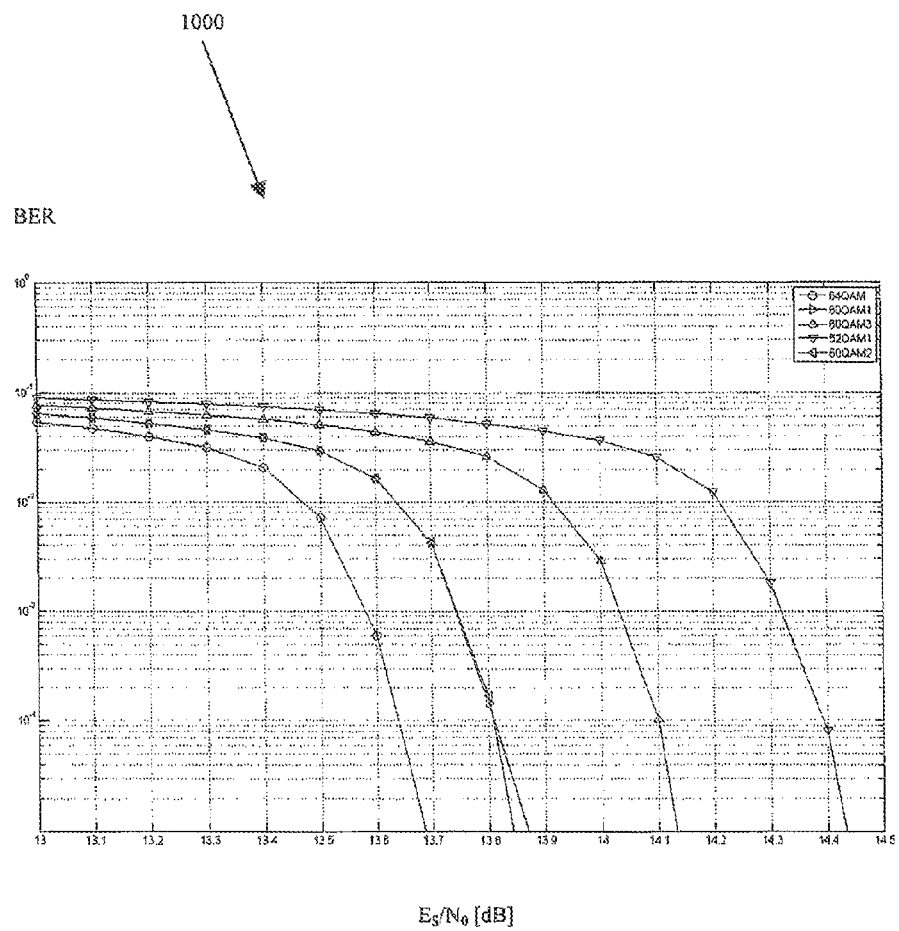
FIG. 10 illustrates a performance diagram of a method for providing a first modulation scheme based on a second modulation scheme when using a DVBS2 code with r=0.66 as the channel code.

In the following, simulation results are described for the different 64QAM based NU-BM/NR-SCS combinations as shown in FIGS. 5 to 8. FIG. 9 illustrates a performance diagram of the method 100 for providing a first modulation scheme based on a second modulation scheme when using a DVBS2 code with r=0.25 as the channel code. FIG. 10 illustrates a performance diagram of the method 100 for providing a first modulation scheme based on a second modulation scheme when using a DVBS2 code with r=0.66 as the channel code. FIG. 11 illustrates a performance diagram of the method 100 for providing a first modulation scheme based on a second modulation scheme when using a convolutional code with r=0.33 and memory=6 as the channel code. FIG. 12 illustrates a performance diagram of the method 100 for providing a first modulation scheme based on a second modulation scheme when using a convolutional code with r=0.5 and memory=3 as the channel code.

Each of the simulations takes into account channel coding, interleaving, modulation, AWGN noise, demodulation, de-interleaving and channel decoding. Note that interleaving may be omitted, but may randomize the puncture bit positions for the channel code. In the simulations, Gray (or near-Gray) bit mapping is applied to all SCSs.

Simulation results are given for four different channel codes: Two LDPC codes (with 50 iterations and termination) from the DVBS2 standard and two convolution codes. All plots illustrate BER (y-axis) versus Es/No (x-axis). Here, "Es" is the symbol energy, which is normalized to 1 in this example and "No" is the noise power of the complex AWGN.

In the simulation results of FIGS. 9 to 12 it can be seen that the performance degradation of all new mappings is very small despite their PAPR reduction of 25-43%. A closer look reveals that the performance penalty is smallest for strong codes, e.g. as illustrated in FIG. 9. Here, the penalty for 60QAM1 and 60QAM2 is only 0.01 dB. For weaker codes, e.g. as illustrated in FIG. 12, the worst penalty is ~0.8 dB.

60QAM1 and 60QAM2 have an identical performance, since they only differ by the position of the random puncturing. 52QAM has the worst performance, but provides the highest PAPR reduction.

Table 1 illustrates a comparison of the metrics "peak-to-average-power-ratio (PAPR)", "PAPR reduction compared to 64QAM", "random puncturing rate" and "scaling gain" for the modulation schemes as depicted in FIGS. 5 to 8 and for QAM64 as reference modulation scheme.

TABLE 1

Comparison of metrics for 64QAM, 60QAM1, 60QAM2, 60QAM3 and 52QAM1

| Metric | 64QAM | 60QAM1 | 60QAM2 | 60QAM3 | 52QAM1 |
| --- | --- | --- | --- | --- | --- |
| Peak-to-average-power ratio (PAPR) [dB] | 3.68 | 2.62 | 2.62 | 2.78 | 2.07 |
| PAPR reduction compared to 64QAM | 0 | 28.86% | 28.86% | 24.41% | 43.71% |
| random puncturing rate | 0.00% | 2.08% | 2.08% | 2.08% | 8.33% |
| scaling gain (signal power) [dB] | 0.00 | 0.08 | 0.08 | 0.16 | 0.33 |

FIG. 13 illustrates in form of a block diagram a device 1300 for modulating data according to a first modulation scheme 201 based on a second modulation scheme 102 as an exemplary embodiment. The device 1300 includes a unit 1310 that is configured to perform a method 100 as described in connection with FIGS. 1 to 8. The device 1300 receives data and outputs modulated data. According to an embodiment, the device 1300 is a modulator. According to a further embodiment, the device 1300 is a demodulator performing an inverse of the method as described in connection with FIGS. 1 to 8. According to yet another embodiment, the device 1300 is a modem performing both, the method and the inverse of the method as described in connection with FIGS. 1 to 8.

FIG. 14 schematically illustrates a method 1400 for providing a first modulation scheme based on a second modulation scheme as an exemplary embodiment. For example, the method 1400 may be read in connection with FIG. 15. The second modulation scheme 103 includes a first subset of constellation points (A) associated with a first subset of bit patterns (I) and a second subset of constellation points (B) associated with a second subset of bit patterns (II). The method 1400 includes a step 1401 of mapping the second subset of bit patterns (II) from the second subset of constellation points (B) to the first subset of constellation points (A) wherein each constellation point of the second subset of constellation points (B) is associated with an energy greater than a predetermined non-zero threshold value 1520. Each constellation point of the first subset of constellation points (A) may be associated with an energy smaller than the predetermined non-zero threshold value 1520.

The method 1400 may be applied to second and first modulation schemes as depicted in FIGS. 2 to 8. The dashed circles 101, 201, 301, 401, 501, 601 and 701 represent exemplary values for the non-zero threshold value 1520. FIG. 15 depicts an exemplary assignment of constellation points to the two subsets A and B of constellation points. The subset B of constellation points contains constellation points having energies higher than the energies of constellation points assigned to the subset A. Bit patterns II are assigned to constellation points of subset B while bit patterns I are assigned to constellation points of subset A.

FIG. 15 illustrates a block diagram of a device 1500 for modulating data according to a first modulation scheme 201 based on a second modulation scheme 102 as an exemplary embodiment. The device 1500 includes a unit 1510 that may perform a method as described in connection with FIG. 14 and FIGS. 1 to 8. The device 1500 receives data and outputs modulated data. According to an embodiment, the device 1500 is a modulator. According to a further embodiment, the device 1500 is a demodulator performing an inverse of the method as described above with respect to FIGS. 14 and 1 to 8. According to yet another embodiment, the device 1500 is a modem performing both, the method and the inverse of the method as described above with respect to FIGS. 14 and 1 to 8.

FIG. 16 schematically illustrates a method 1600 for providing a modulation scheme as an exemplary embodiment. The method 1600 includes a step 1601 of mapping two different bit patterns 107 and 111 to a same constellation point 105 of the modulation scheme 101.

The method 1600 may be applied to second and first modulation schemes as, for example, depicted in FIGS. 2 to 8. With respect to FIG. 2, the two different bit patterns may be the bit patterns 107 ("0011") and 111 ("0010") that are mapped to the same constellation point 105. According to the embodiment depicted in FIG. 2, the energy of the constellation point 109 associated to the bit pattern 111 ("0010") is higher than the energy of the constellation point 105 associated to the bit pattern 107 ("0011").

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that embodiments of the invention may be implemented in discrete circuits, partially integrated circuits or fully integrated circuits or programming means. Also, the terms "exemplary", "for example" and "e.g." are merely meant as an example, rather than the best or optimal.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for providing a first modulation scheme based on a second modulation scheme, the second modulation scheme comprising a first constellation point associated with a first bit pattern and a second constellation point associated with a second bit pattern, and other constellation points, comprising:

mapping the second bit pattern from the second constellation point to the first constellation point, wherein the first bit pattern and the second bit pattern are assigned to the same first constellation point, wherein an energy associated with the second constellation point is greater than an energy associated with the first constellation point; and defining the first modulation scheme to comprise the other constellation points and the first constellation point at the mapped second bit pattern from the second constellation point to the first constellation point.

2. The method of claim 1, wherein the first and second constellation points are arranged in a complex plane, and the energy associated with each of the first and second constellation points corresponds to a distance between the respective constellation point and an origin of the complex plane.

3. The method of claim 1, wherein each of the first modulation scheme and the second modulation scheme comprises an average power depending on the powers of all constellation points of the respective modulation scheme and wherein the method further comprises:

increasing a distance between constellation points of the first modulation scheme such that the average power of the first modulation scheme substantially equals the average power of the second modulation scheme.

4. The method of claim 1, wherein a Crest factor of the first modulation scheme is smaller than a Crest factor of the second modulation scheme.

5. The method of claim 1, wherein the second constellation point is adjacent to the first constellation point.

6. The method of claim 1, wherein the first bit pattern and the second bit pattern differ by a single bit.

7. The method of claim 1, wherein the second modulation scheme is based on a Gray mapping.

8. The method of claim 1, wherein the second modulation scheme is a QAM modulation scheme.

9. The method of claim 8, wherein the second constellation point is an edge point of the QAM modulation scheme.

10. The method of claim 1, wherein each of the constellation points is associated with a modulation of a carrier signal carrying a bit pattern associated with the respective constellation point.

11. The method of claim 10, further comprising:

modulating the carrier signal with a phase and an amplitude of the first constellation point.

12. The method of claim 1, wherein the second modulation scheme comprises a third constellation point associated with a third bit pattern and the method further comprises:

mapping the third bit pattern from the third constellation point to the first constellation point wherein an energy associated with the third constellation point is greater than an energy associated with the first constellation point; and further defining the first modulation scheme to comprise the other constellation points and the first constellation point at the mapped third bit pattern from the third constellation point to the first constellation point.

13. The method of claim 12, wherein the third constellation point is adjacent to the first constellation point.

14. The method of claim 1, wherein the second modulation scheme comprises a third constellation point associated with a third bit pattern and a fourth constellation point associated with a fourth bit pattern and the method further comprises:

mapping the fourth bit pattern from the fourth constellation point to the third constellation point wherein an energy associated with the fourth constellation point is greater than an energy associated with the third constellation point; and further defining the first modulation scheme to comprise the other constellation points and the third constellation point at the mapped fourth bit pattern from the fourth constellation point to the third constellation point.

15. The method of claim 14, wherein the fourth constellation point is adjacent to the third constellation point.

16. The method of claim 14, wherein the constellation points are arranged in a complex plane and wherein the first constellation point, the second constellation point, the third constellation point and the fourth constellation point are arranged in a same quadrant of the complex plane.

17. The method of claim 14, wherein the constellation points are arranged in a complex plane, wherein the first constellation point and the second constellation point are arranged in a first quadrant of the complex plane and wherein the third constellation point and the fourth constellation point are arranged in a second quadrant of the complex plane.

18. The method of claim 1, wherein a number of constellation points of the first modulation scheme is greater than half of a number of constellation points of the second modulation scheme.

19. The method of claim 1, further comprising:

applying a channel code to data comprising at least one of the first bit pattern and the second bit pattern before mapping the second bit pattern, wherein the channel code particularly comprises at least one of a convolutional code and a low density parity check code.

20. A method for providing a first modulation scheme based on a second modulation scheme, the second modulation scheme comprising a first subset of constellation points associated with a first subset of bit patterns and a second subset of constellation points associated with a second subset of bit patterns, and other subsets of constellation points, comprising:

mapping the second subset of bit patterns from the second subset of constellation points to the first subset of constellation points, wherein a bit pattern of the first subset of bit patterns and a bit pattern of the second subset of bit patterns are assigned to a same constellation point of the first subset of constellation points, wherein each constellation point of the second subset of constellation points is associated with an energy greater than a predetermined non-zero threshold value; and defining the first modulation scheme to comprise the other subsets of constellation points and the first subset of constellation points at the mapped second subset of bit patterns from the second subset of constellation points to the first subset of constellation points.

21. The method of claim 20, wherein each constellation point of the first subset of constellation points is associated with an energy smaller than the predetermined non-zero threshold value.

22. An apparatus comprising:

a device for modulating data according to a first modulation scheme based on a second modulation scheme, the second modulation scheme comprising a first constellation point associated with a first bit pattern and a second constellation point associated with a second bit pattern, the device further comprising:

a configuration unit configured to map the second bit pattern from the second constellation point to the first constellation point, wherein the first bit pattern and the second bit pattern are assigned to the same first constellation point, wherein an energy associated with the second constellation point is greater than an energy associated with the first constellation point, wherein the first modulation scheme is defined to comprise other constellation points and the first constellation point at the mapped second bit pattern from the second constellation point to the first constellation point.

23. An apparatus comprising:

a device for modulating data according to a first modulation scheme based on a second modulation scheme, the second modulation scheme comprising a first subset of constellation points associated with a first subset of bit patterns and a second subset of constellation points associated with a second subset of bit patterns, the device further comprising:

a configuration unit configured to map the second subset of bit patterns from the second subset of constellation points to the first subset of constellation points, wherein a bit pattern of the first subset of bit patterns and a bit pattern of the second subset of bit patterns are assigned to a same constellation point of the first subset of constellation points, wherein each constellation point of the second subset of constellation points is associated with an energy greater than a predetermined non-zero threshold value, wherein the first modulation scheme is defined to comprise other subsets of constellation points and the first subset of constellation points at the mapped second subset of bit patterns from the second subset of constellation points to the first subset of constellation points.

* * * * *